Patented Jan. 26, 1943

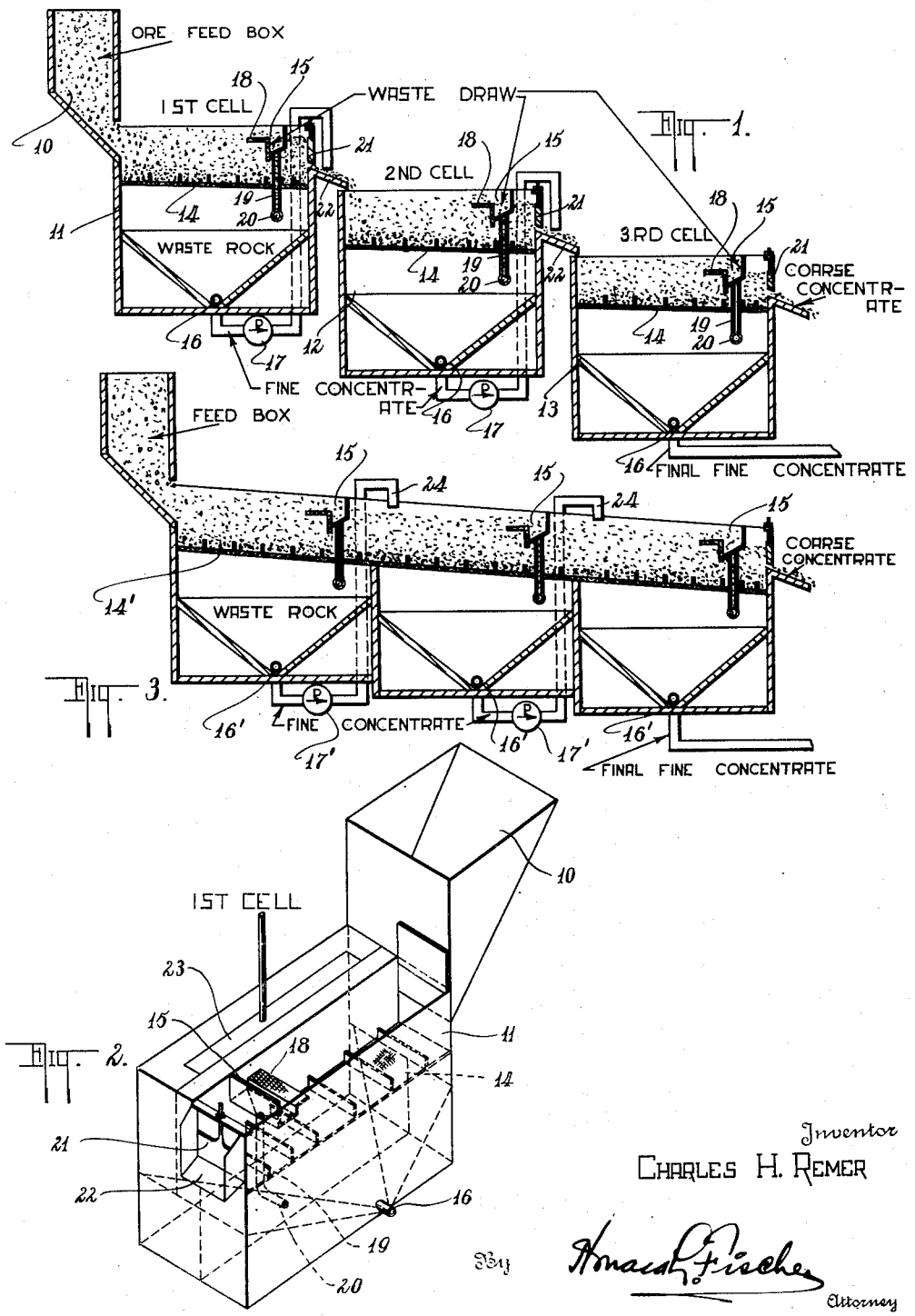

2,309,275

UNITED STATES PATENT OFFICE 2,309,275

JIG FOR CONCENTRATING ORE

Charles H. Remer, Hibbing, Minn.

Application May 10, 1940, Serial No. 334,391

2 Claims. (Cl. 209—457)

This method consists of jig concentration and is particularly adapted for use on low grade iron ore or other ore where it is desirable to make a more perfect separation of the waste material from the ore.

In carrying out this method any standard multiple cell jig can be used. The difference between this process and standard jig processes is that some of the waste rock is drawn off of the top of each cell and the remainder of the ore is retreated in the next jig cell.

Heretofore methods have been employed where a process of gravity concentration has been used; however, these methods require certain apparatus and an expensive heavy chemical liquid made up to a certain specific gravity. In such processes a layer of water has to be kept on top of the chemical liquid to seal the escape of the fumes from the chemical, and in such processes, some of the expensive liquid used is carried away with the mineral and waste and has to be washed off so as to separate the liquid from the ore, making the operating cost rather high. In these former processes it is not practical to treat ore smaller than $\frac{3}{16}$ or $\frac{1}{8}$ of an inch and the ore smaller than this has to be screened out. Further, in these former processes there is a certain waste of ore because the processes failed to separate the ore concentrate from the waste and therefore such former processes are too expensive and are not practical on low grade ore, all of which disadvantages are overcome by the present process.

To assist in more particularly defining my process I have diagrammatically illustrated a longitudinal section through any three-cell jig in Figure 1.

In this figure, the ore is fed in through the ore feed box 10 where it enters at the top of the first cell 11. From this first cell 11 the ore is carried over into the second cell 12 and on from the second cell to the third cell 13. Each cell is provided with a screen 14 and across the ore compartment of each cell I provide a waste draw 15.

The fine concentrate is drawn off at 16 from the bottom of each cell and by means of a pump 17 or other suitable means, the fine concentrate is elevated as illustrated to the spill-over leading to the next adjacent cell, such as from cell 11 to cell 12, and from cell 12 to cell 13. From cell 13, the final fine concentrate is drawn off at the point 16 at the bottom of said cell, where the three cells are employed as illustrated. In providing the waste draws 15 across each of the cells 11, 12 and 13, I am able to carry off some of the waste rock at the top of each cell, which would otherwise interfere with the operation of the cell jig and prevent the proper and more perfect separation which I accomplish by my process.

Each waste draw 15 is in the form of a trough extending across the ore chamber above the screen 14, and I provide each trough with a horizontal shelf quarter inch mesh screen 18. The screen 18 permits fine ore concentrate to sift through to the screen 14 and onto the bottom where it is withdrawn at 16. The waste rock is discharged from the draws 15 through the pipe 19 and through the tail discharge 20 to carry the same away from each cell 11, 12 and 13. Each cell 11, 12 and 13 is provided with an adjustable gate 21 so as to regulate the overflow of the ore concentrate from one cell to the other across the spill-ways 22 leading to the adjacent cell. These adjustable gates 21 regulate the height of the liquid and ore in the respective cells. It is also apparent that the waste draws 15 may be made of an adjustable nature if desired, so as to regulate the point at which the draw will withdraw the waste rock from the respective cells.

Thus in my process I provide a waste draw positioned above the screens 14 of the cells which acts in a manner to draw off the top waste rock of extremely low ore content and thus take the same away from the operation of each cell, permitting the respective cells to operate more efficiently in separating the fine concentrate from the waste material.

Figure 2 diagrammatically illustrates in perspective one of the jig cells such as 11, showing the ore feed box 10 which feeds the ore into the first cell. Figure 2 illustrates the plunger agitator 23 which may be operated in any suitable manner to agitate the liquid in the cell and to cause the pulsating action of the liquid to assist in the operation of the jig cell to separate the ore concentrate from the waste material. In this drawing the waste draw 15 is illustrated extending across the ore chamber above the screen 14 and which clearly shows the shelf 18 associated with the waste draw 15. This illustration also shows the pipes 19 and 20 which draw the waste material from the draw 15. The withdrawal opening 16 for the fine concentrate is also more clearly shown.

The illustrations throughout the drawing are only for the purpose of showing in a diagrammatic way the manner in which my process may be carried out and it should be borne in mind that any suitable means wherein my method can be employed may be used in place of the apparatus illustrated.

In Figure 3 I have illustrated my process or method as applied for use on a continuous cell jig. In this illustration I have shown the screen 14, together with the several waste draws 15, extending across the respective compartments of this continuous cell jig. It will be observed that in this continuous cell jig the fine concentrate which is drawn off at the point 16 of each of the two first compartments, is carried from the pump 17' by the pipe 24 to the next adjacent compartment beyond the respective waste draws 15.

My method of jig concentration can produce a finished concentrate out of low grade ore on one jig without having to reconcentrate a rough concentrate as in former jig practice. With my process I am able to recover more of the mineral from an ore than by any known former standard jig methods. I have also found that with my process I am able to handle a larger amount of ore than the former standard methods in the same amount of time and in the same size jigs, because stronger pulsations can be used without spoiling the hutch or fine concentrate as the final hutch is made in several steps instead of one step as heretofore. With my process a greater feed can be handled in a given time because the waste is drawn off of the top of each cell faster than the mineral can be drawn off of the bottom of each cell.

By my method where I employ a short screen 18 with openings about half the size of the largest pieces of ore at the point where the waste spills into the waste trough 15, more fine ore can be saved and kept in the jig (making the jig act more like a heavy liquid separation process), thus making a more accurate separation of the mineral and waste. It is apparent that any means may be used to elevate the hutch (fine concentrate) from one cell to the next, such as a small sand pump, air lifts, or bucket elevators, only the pump 17 being shown in the accompanying illustrations. It is also apparent that any method may be used to draw off the scrap or to cut or skim the waste rock off of the top of the jig cells in place of that illustrated by my waste draw 15, and the waste draws may be arranged in several places or in the most desirable manner for the particular separation being made. I have found that my method is accomplished in a practical way by the use of apparatus diagrammatically illustrated in the drawing.

With my method or process I have been able to make separation of the mineral from the waste close to the theoretical perfect separation of the more expensive processes used heretofore, with an operating cost equal or less that of the standard reasonably priced jig methods heretofore employed. I have also found that my new process can concentrate both the fine and coarse ore. Thus I have been able to accomplish a more desirable process and method than has been employed heretofore by more expensive apparatus and methods in which former methods the separation is only practical on coarse ore.

My method or process may be stated as differing from standard jig methods in that in the standard jig methods a lower grade ore is treated in each lower cell or down the cell of a continuous jig because some of the best ore has been taken out; whereas, in my new process a higher grade ore is treated in each lower cell because some of the low grade ore or waste has been removed.

In accordance with the patent statutes I have described my process and have used certain diagrammatic illustrations in the drawing merely for the purpose of assisting in describing the process, and I desire to have it understood that such apparatus may be varied within the scope of the following claims without departing from the spirit and intent of this invention.

I claim:

1. Apparatus for effecting ore separation, comprising a jig formed with a lower compartment and with an upper compartment having a screen bottom into which ore is fed, means to cause water to move back and forth through said screen to agitate the ore on it, a trough extending across the upper compartment having an inflow upper edge at a fixed level across the width of the compartment, a horizontal screen extending rearwardly from said inflow upper edge, outflow means from both compartments, means to regulate the outflow from the upper compartment to maintain the level of the liquid and material in suspension therein so that a portion thereof will overflow said fixed-level edge and fall by gravity into the trough, and a pipe for discharging the material from the trough outside the jig.

2. Apparatus for effecting ore separation, comprising a successive series of jigs each formed with a lower compartment and with an upper compartment having a screen bottom, means for feeding ore upon the screen bottom of the first jig, means to cause water to move back and forth through each of said screens to agitate the ore on it, a trough extending across each of the upper compartments having an outflow upper edge at a fixed level across the width of the compartment, other outflow means for each upper compartment, including means to regulate the outward flow therefrom to maintain the level of the liquid and material in suspension therein so that a portion thereof will overflow said fixed-level edge and fall by gravity into the trough below said edge, a separate pipe from each trough for discharging the material therefrom outside the jig, outflow means from each lower compartment, and means for causing the outflow from each of said lower compartments excepting the last to be returned to the upper compartment of the next jig in the series, the outflow from the last lower compartment carrying away fine ore concentrate.

CHARLES H. REMER.